July 6, 1954  B. W. WORTHINGTON  2,682,690
APPARATUS FOR BLOWING SAND LINED MOLDS
Filed June 5, 1950  10 Sheets-Sheet 1
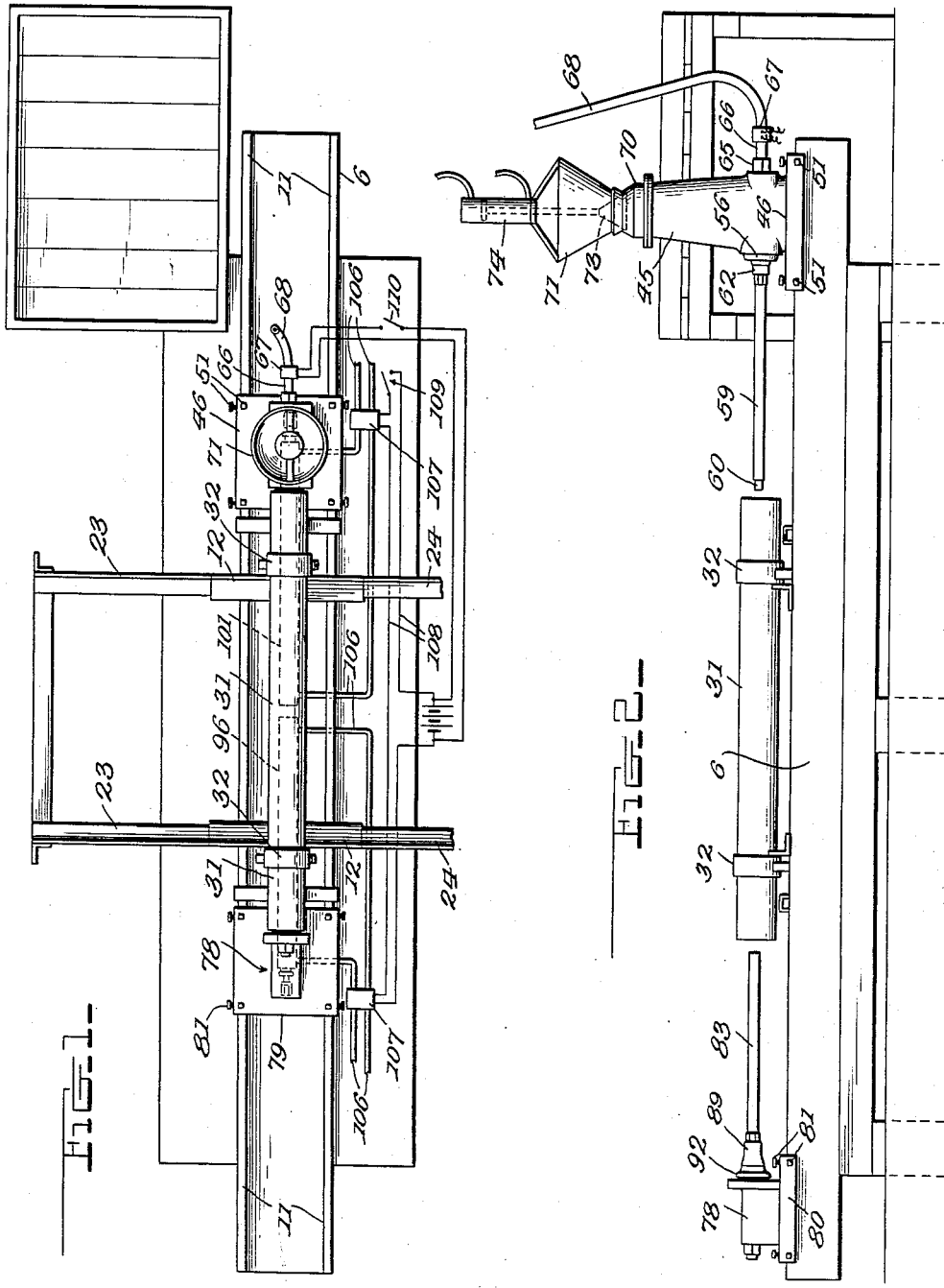
INVENTOR.
Biddle W. Worthington,
BY
Mason, Porter, Diller & Stewart
attys.

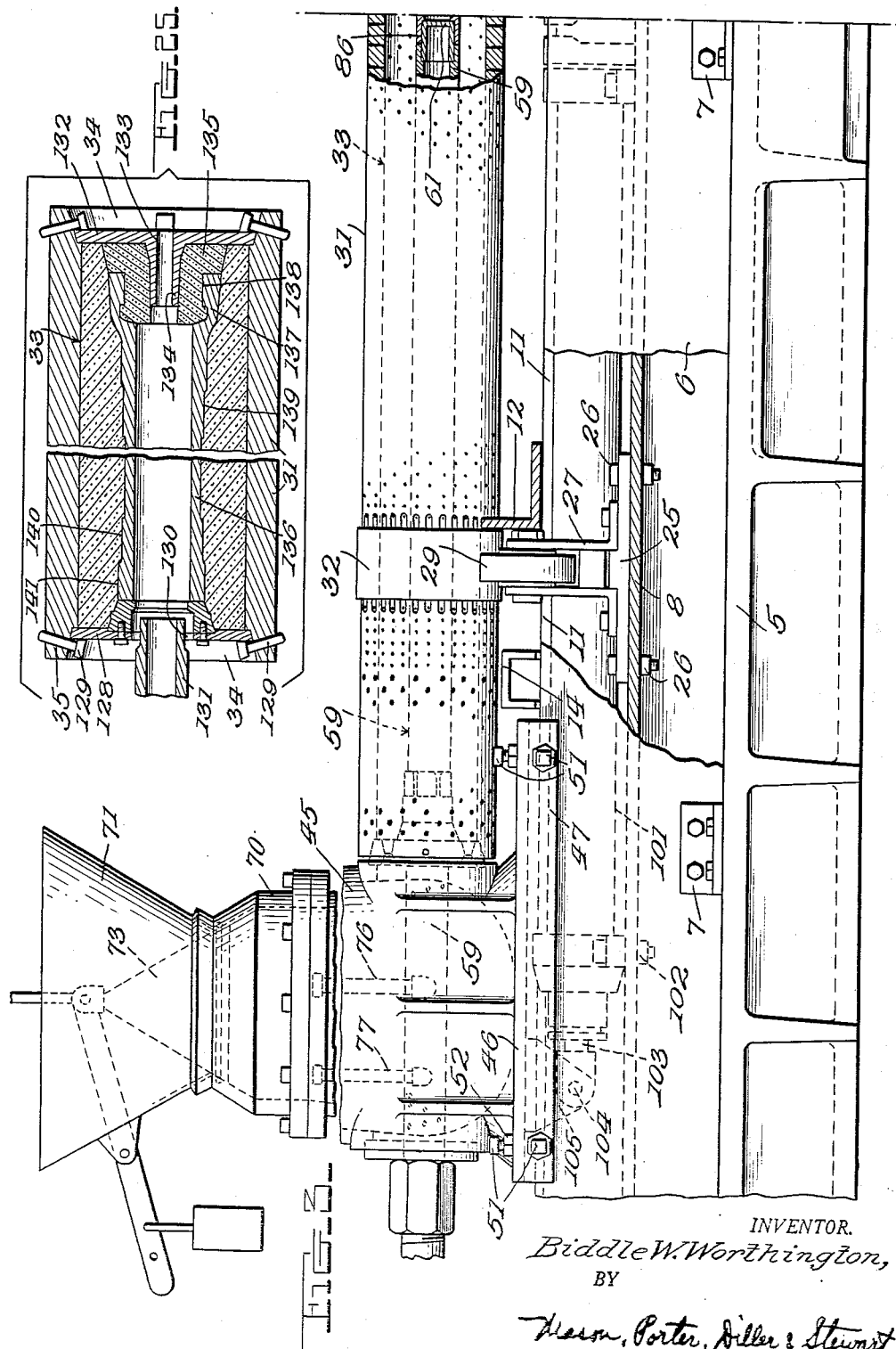

July 6, 1954   B. W. WORTHINGTON   2,682,690
APPARATUS FOR BLOWING SAND LINED MOLDS
Filed June 5, 1950   10 Sheets-Sheet 3
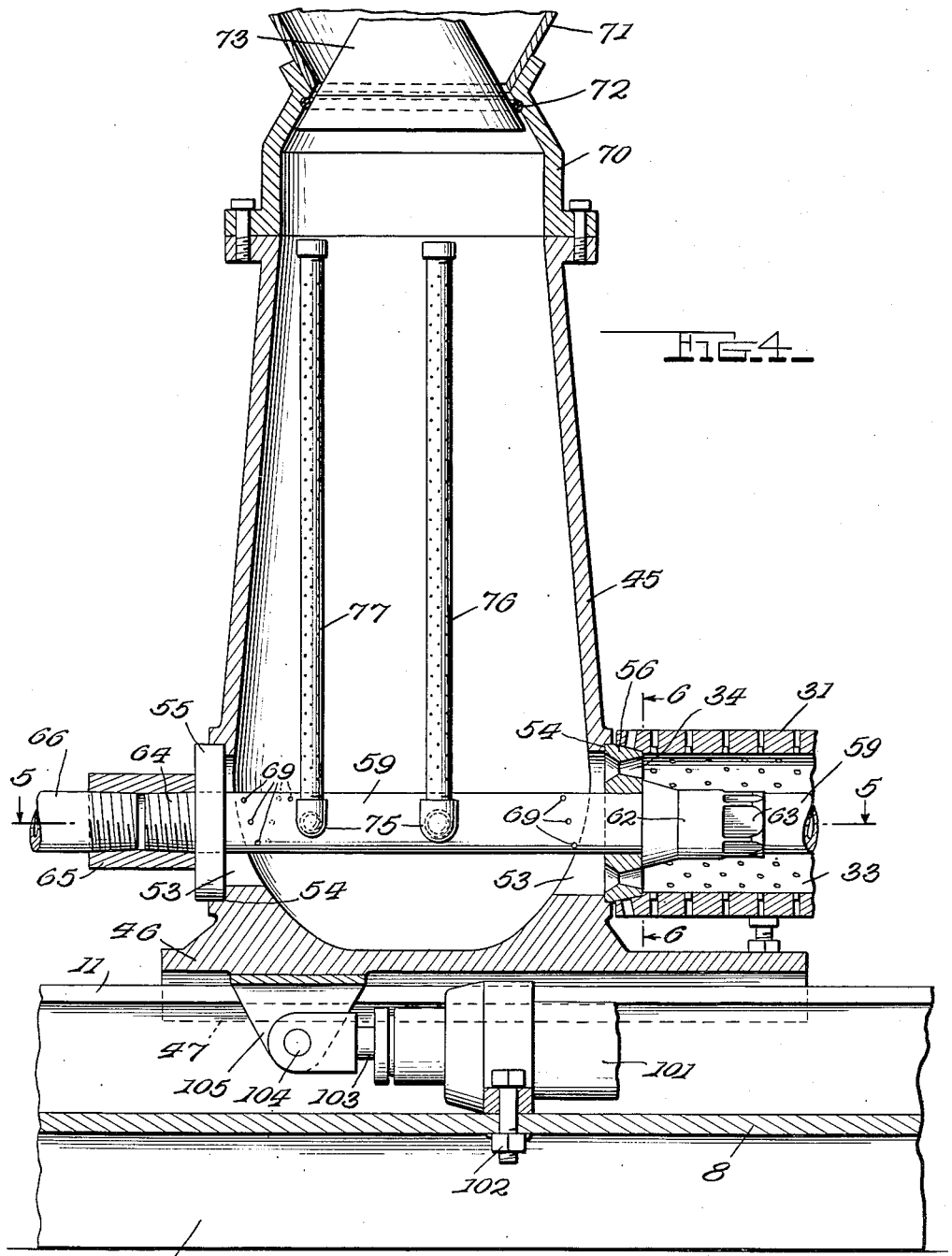
INVENTOR.
Biddle W. Worthington,
BY
Mason, Porter, Diller & Stewart
attys.

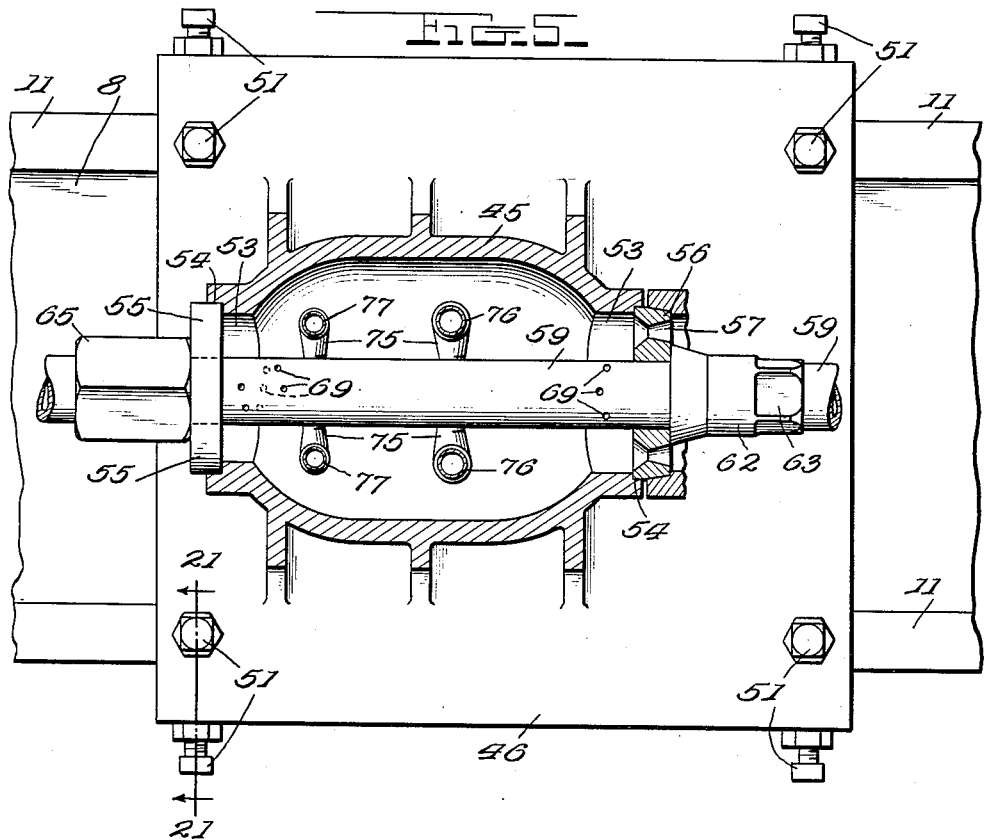
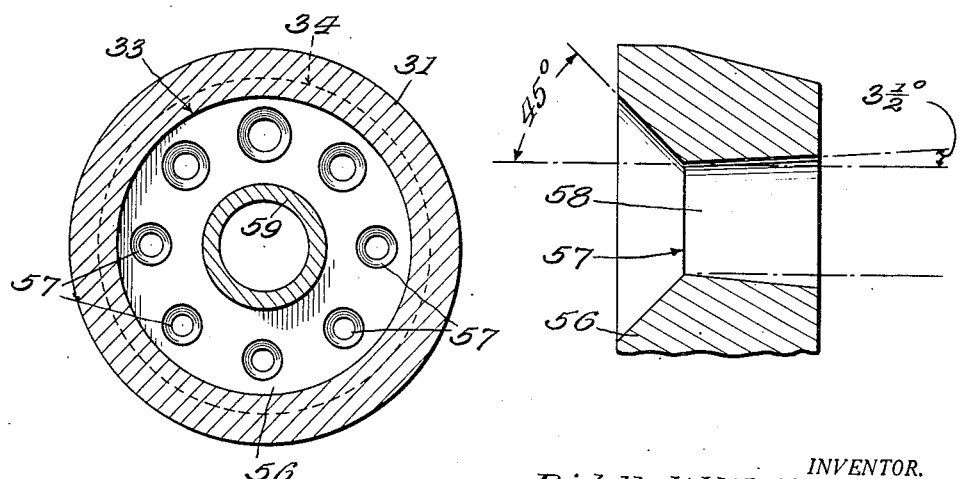

July 6, 1954
B. W. WORTHINGTON
2,682,690
APPARATUS FOR BLOWING SAND LINED MOLDS
Filed June 5, 1950
10 Sheets-Sheet 5
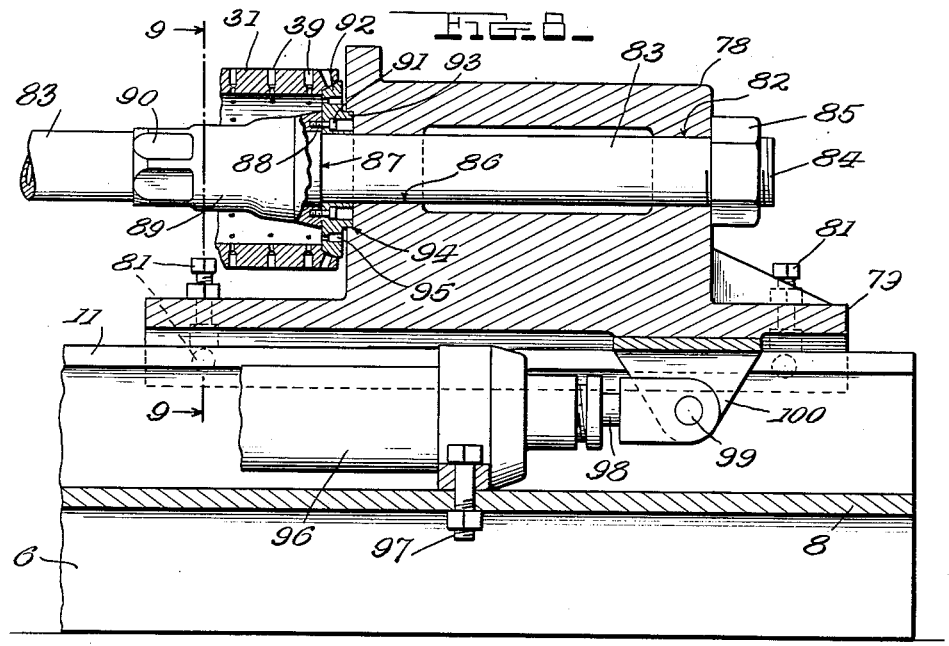
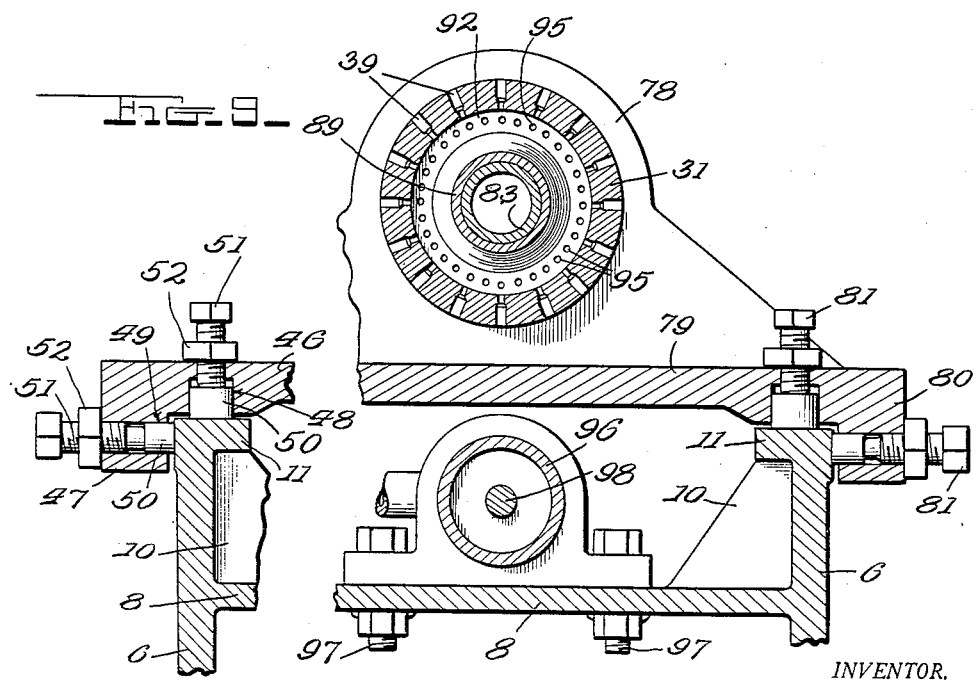
INVENTOR.
Biddle W. Worthington,
BY
Mason, Porter, Diller & Stewart
attys.

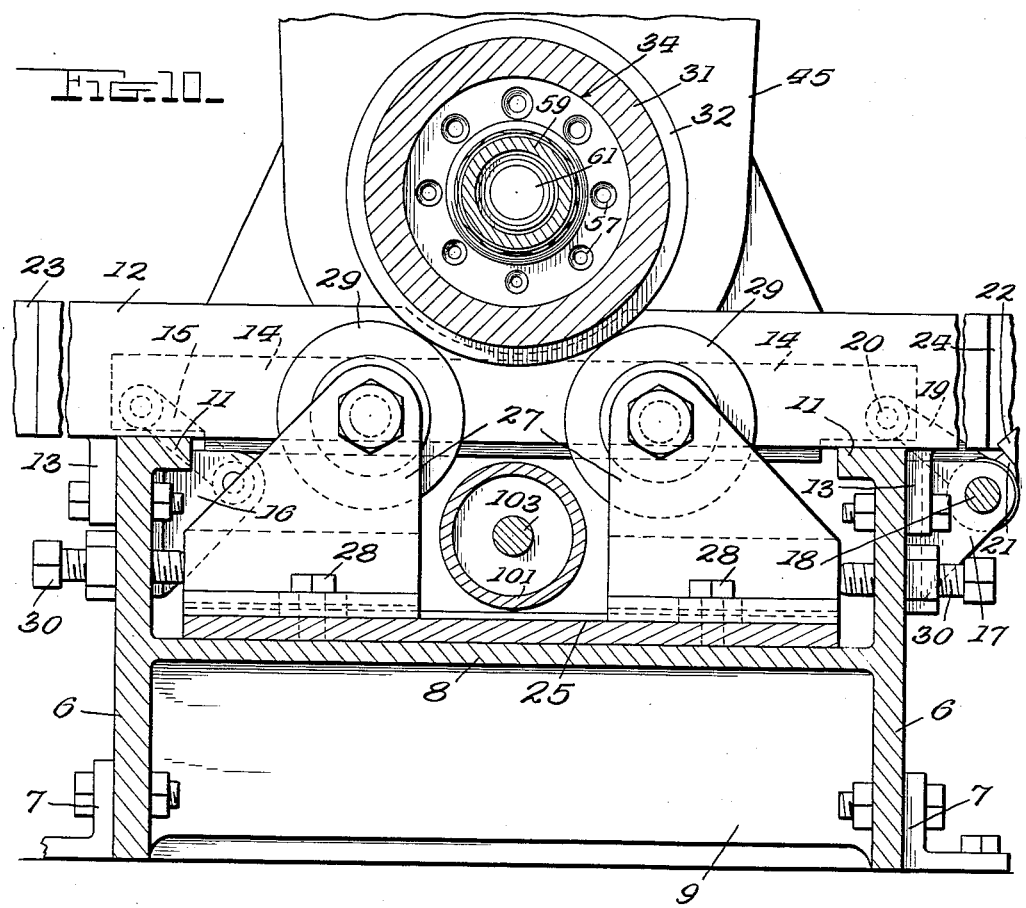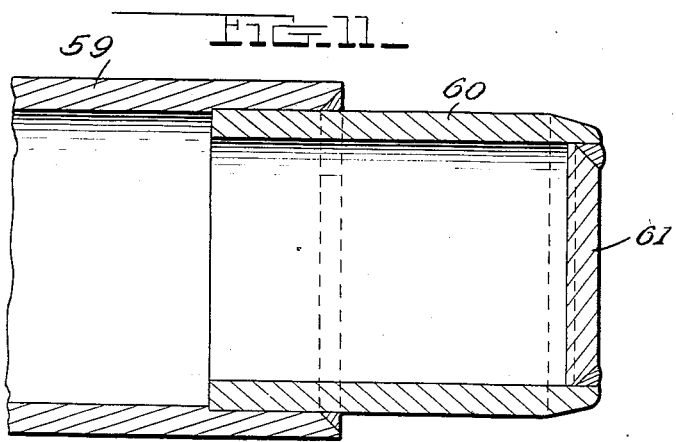

July 6, 1954  B. W. WORTHINGTON  2,682,690
APPARATUS FOR BLOWING SAND LINED MOLDS
Filed June 5, 1950  10 Sheets-Sheet 7
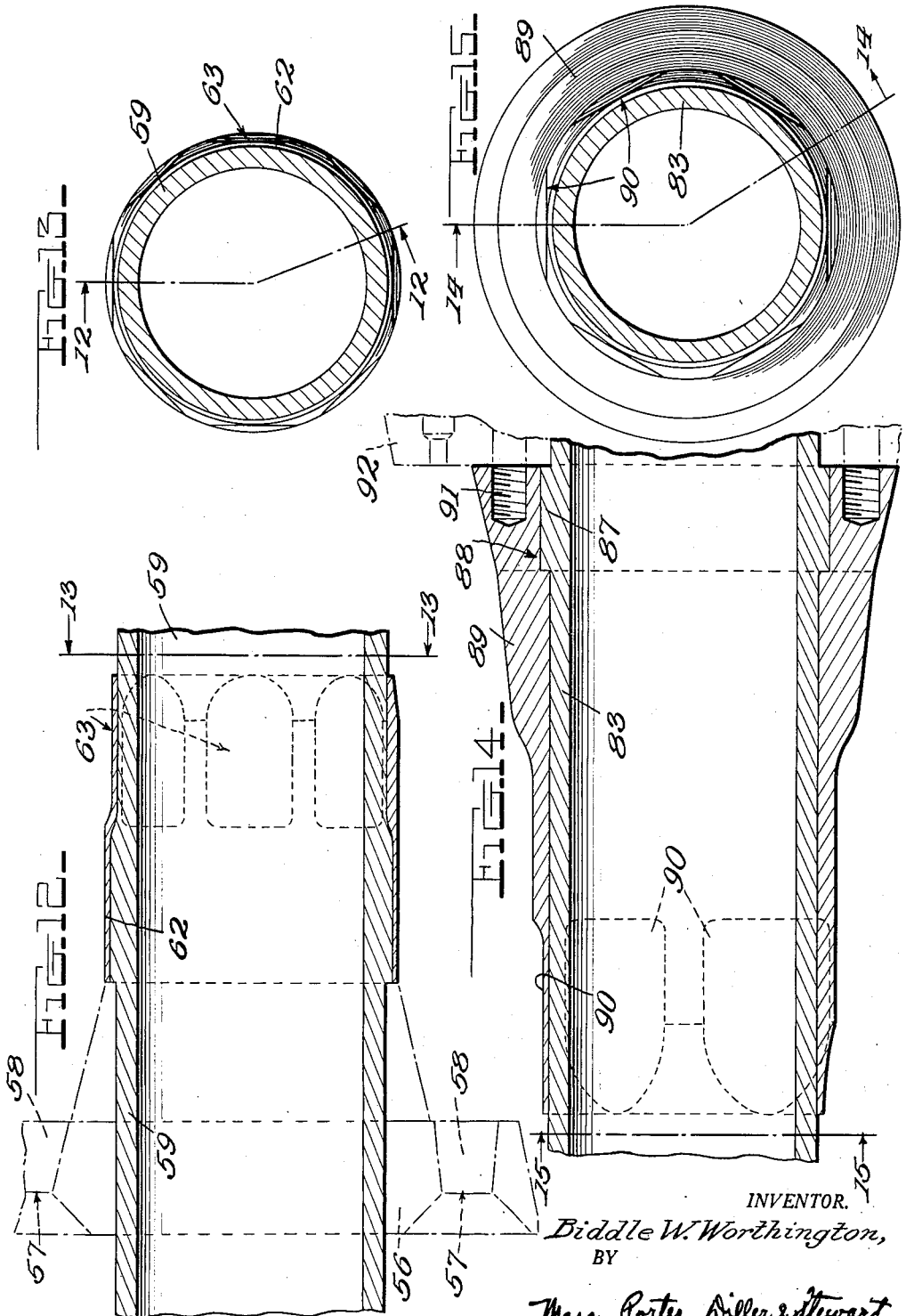
INVENTOR.
Biddle W. Worthington,
BY
Mason, Porter, Diller & Stewart
attys.

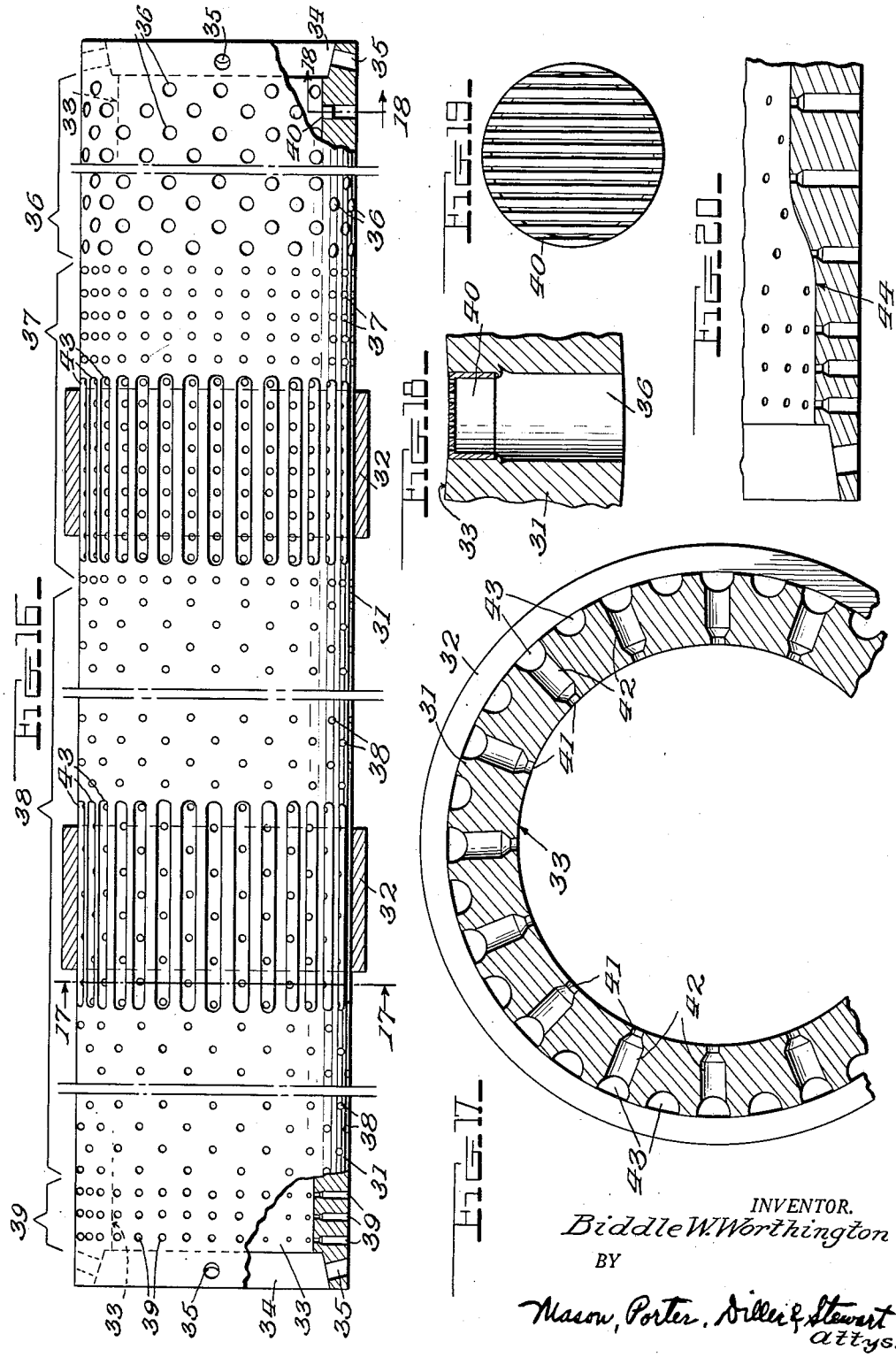

July 6, 1954 B. W. WORTHINGTON 2,682,690
APPARATUS FOR BLOWING SAND LINED MOLDS
Filed June 5, 1950 10 Sheets-Sheet 9
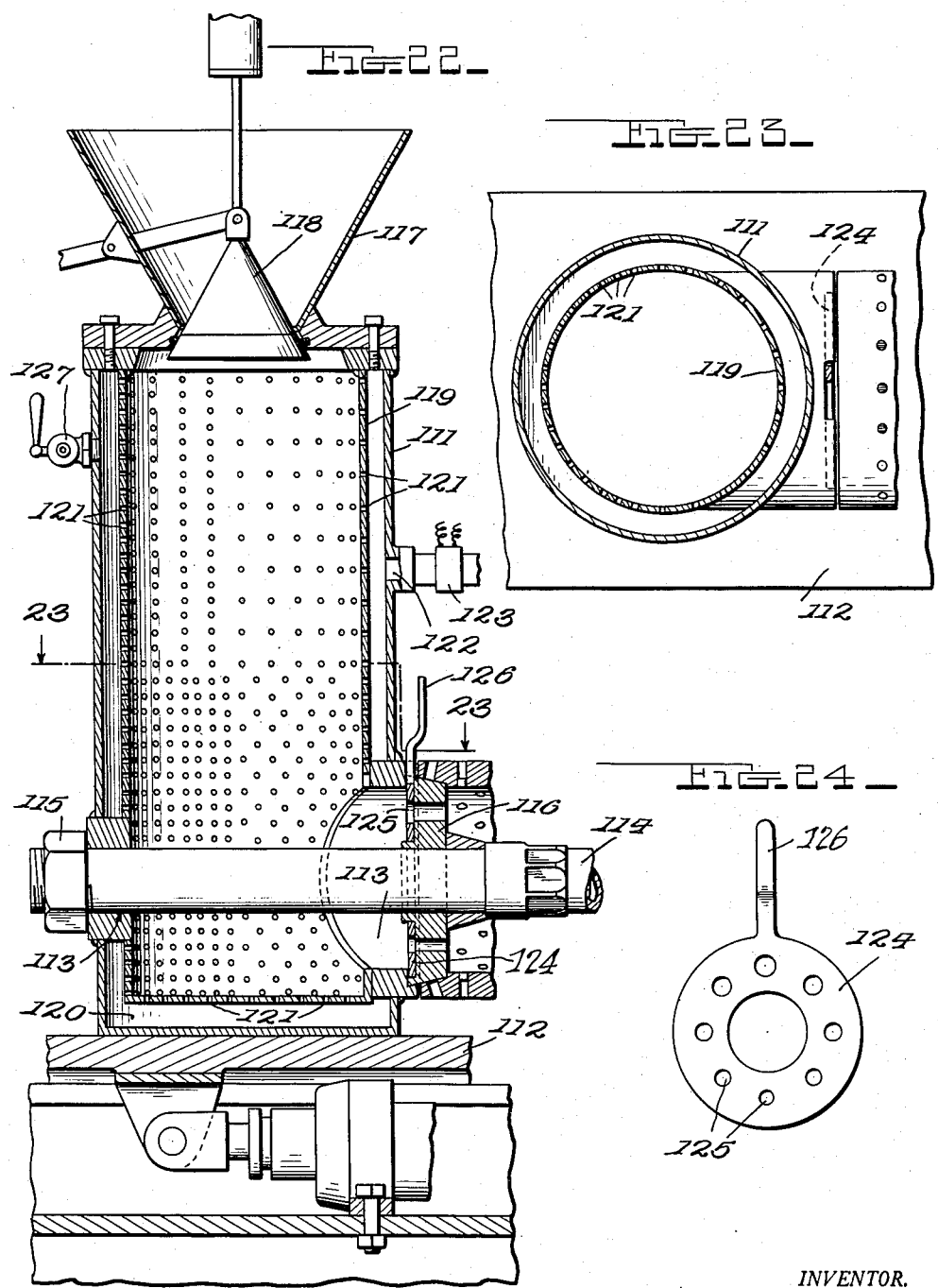
INVENTOR.
Biddle W. Worthington,
BY
Mason, Porter, Diller & Stewart
attys.

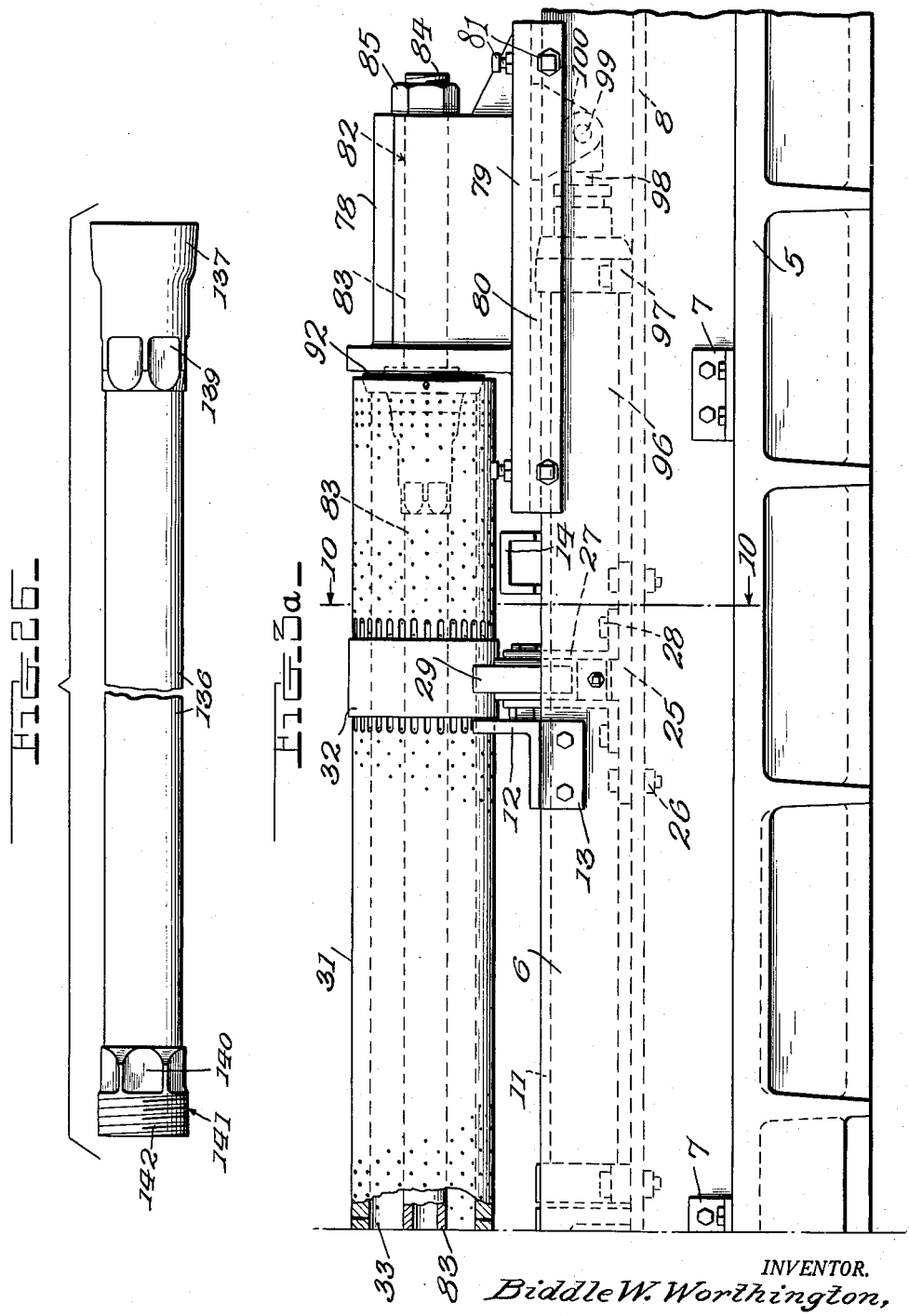

Patented July 6, 1954

2,682,690

UNITED STATES PATENT OFFICE 2,682,690

APPARATUS FOR BLOWING SAND LINED MOLDS

Biddle Wilkinson Worthington, Birmingham, Ala., assignor to McWane Cast Iron Pipe Co., Birmingham, Ala., a corporation of Delaware Application June 5, 1950, Serial No. 166,117

7 Claims. (Cl. 22—36)

The invention relates generally to the art of centrifugally casting pipe, and it primarily seeks to provide a novel apparatus for forming sand lined molds in which to cast pipe in the manner stated.

Methods of centrifugally casting pipe are well known and widely practiced at the present time, most of such casting being carried out in so-called permanent molds formed of metal, and some being carried out in sand lined molds. The methods of casting pipe in permanent molds have been eminently successful, and yet are subject to improvement because of the initial and replacement costs of the molds and because of other limitations not the least of which is the necessity of stripping the cast products endwise from the molds and the resultant inability to cast products having radial projections which would interfere with such stripping. The broad idea of casting pipe centrifugally in sand lined molds gives great promise of improvement by way of cost reduction, because of the possibility of forming the sand linings in flasks subject to repeated use with sand lining replacement for each casting, and the possibility of forming sand linings in which pipe having non-circular portions or radial projections and which can be stripped readily by "knocking out" of the sand linings can be cast. However, all attempts to make the casting of pipe in sand lined molds commercially feasible of which I am aware have been unsuccessful because of cost or impracticability. It is a purpose of the present invention to provide a novel apparatus for forming sand lined molds in which to centrifugally cast pipe.

In some methods of forming sand lined molds the placement and shaping of the sand lining in the molds has been effected during rapid rotation of the flasks, and in at least one said method it has been proposed to place the sand in the flask with the latter in a vertical position, and then to bring the flask into a horizontal position for the final shaping of the lining. Naturally, in the practicing of methods requiring spinning of the flasks, there is much wastage of time and effort in the spinning of the flask and in starting and stopping the same. Also, in the changing of position of flasks from vertical to horizontal, and vice versa, much labor and handling apparatus necessarily are employed which could be dispensed with by elimination of the need for changing the position of the flask. Moreover, in methods in which the flasks are rotated, the final shaping of the sand linings is effected by pressing a shaping pattern or mandrel against the rotating sand lining. This practice is impractical because it provides mold linings the molten metal contacting surfaces of which necessarily are surfaces of rotation, and it is impossible to cast in such linings pipe having any non-circular outward projections. It must be apparent also that in methods involving rotation of the flasks and pressure shaping of the internal surfaces of the linings serious problems are presented in casting pipe of uniform thicknesses throughout the length thereof because of deflection of the pressure applying or shaping devices, and these problems become increasingly difficult as the length of pipe to be cast increases. It is a purpose of the present invention to provide a novel apparatus for forming sand lined molds in which pipe may be centrifugally cast without encountering the problems referred to hereinabove and many other lesser problems presented in known practices but not specifically mentioned herein.

In its more detailed nature the novel apparatus comprises a hollow cylindrical flask, means for supporting the flask in generally horizontal position, pattern means generally cylindriform in shape and of a diameter for being spaced inwardly of and coaxially with relation to the inner wall of the flask to cooperate therewith in forming an annular elongated sand lining receiving and shaping chamber, means for bringing about relative longitudinal movement between the flask and pattern means to place the pattern means in the annular chamber forming position or for removing it from said position, means for forming a closure at one end of said shaping chamber, means for holding a mass of sand opposite the other end of the chamber, means for directing air under pressure into the mass of sand to aerate the same and force sand into the shaping chamber, means for directing the air blown sand into said chamber endwise through said other end simultaneously about the whole circle of the chamber while holding the flask and pattern means stationary, and means for permitting air to escape from the shaping chamber while retaining sand therein so as to fill the chamber with uniformly packed sand.

Another object of the invention is to provide an apparatus of the character stated in which the means for permitting the air to escape from the shaping chamber comprises escape orifices arranged circumferentially about and extending through the wall of the flask throughout the length thereof.

Another object of the invention is to provide an apparatus of the character stated wherein the orifices adjacent the end of the flask into which the air is directed are less restricted than those provided throughout the main body of the flask.

Another object of the invention is to provide an apparatus of the character stated in which the means for directing air under pressure into the mass of sand comprises a cylindrical duct aligned with the pattern means and of no substantially larger diameter surrounded by the sand mass in a sealed chamber and having therein orifices opening outwardly into the sand mass about the whole circumference of the duct, and valve controlled means for directing air under pressure into the duct.

Another object of the invention is to provide an apparatus of the character stated in which the means for directing air blown sand into the shaping chamber includes a ring having orifices therein spaced about the whole circle of the chamber and through which the air blown sand passes into said chamber, the orifices preferably being arranged in a novel manner for allowing a greater amount of sand to enter through the top half of the ring than through the bottom half, thereby to compensate for gravity action which might otherwise tend to cause a packing of the sand to a greater degree in the lower half of the chamber than in the upper half.

Another object of the invention is to provide an apparatus of the character stated in which the means for directing air under pressure into the mass of sand also includes a plurality of perforated pipes extending uprightly in the sand containing sealed chamber from the cylindrical duct, and the pipes and their perforations being arranged in a novel manner for preventing short circuiting of the air directly into the shaping chamber.

Another object of the invention is to provide an apparatus of the character stated in which the pattern means comprises at least one longitudinally movable generally cylindrical member, and wherein there is included a trackway, a head supporting the pattern member and slidable on the trackway, fluid pressure means for moving the head, and means for adjusting the position of the head on the trackway to accurately align the pattern member with relation to the flask.

Another object of the invention is to provide an apparatus of the character stated wherein there is included a second pattern member axially aligned with the head supported member and which is supported by a sand box in which the sealed chamber holding the mass of sand is formed, said box being movable over the trackway by fluid pressure operated means.

With the above and other objects in view that will hereinafter appear, the nature of the invention will be more clearly understood by reference to the following detailed description, the appended claims and the several views illustrated in the accompanying drawings.

In the drawings:

Figure 1 is a somewhat diagrammatic plan view illustrating the invention, the patterns being illustrated as inserted in the flask ready for a sand blowing operation.

Figure 2 is a side elevation of the diagrammatically illustrated apparatus of Figure 1, the patterns being shown retracted from the flask.

Figures 3 and 3a together comprise a side elevation of the apparatus, parts being broken away and in section, the patterns being shown inserted in the flask, and the side opposite the side illustrated in Figure 2 being shown.

Figure 4 is an enlarged central vertical longitudinal section taken through the sand box.

Figure 5 is a horizontal section taken on the line 5—5 of Figure 4.

Figure 6 is an enlarged detail vertical cross section taken on the line 6—6 on Figure 4.

Figure 7 is an enlarged detail vertical cross section taken through the orifice ring and illustrating one of the orifices through which the sand is blown into the shaping chamber.

Figure 8 is an enlarged central vertical longitudinal section through the shiftable head by which one of the pattern members is supported.

Figure 9 is a vertical cross section taken on the line 9—9 on Figure 8.

Figure 10 is an enlarged fragmentary vertical cross section taken on the line 10—10 on Figure 3a.

Figure 11 is an enlarged fragmentary vertical longitudinal section of the plugged end extremity of the pattern member carried by and shiftable with the sand box.

Figure 12 is an enlarged fragmentary vertical longitudinal section illustrating the portion of the sand box carried pattern member provided with the thread enlargement and non-circular face providing shaping ring, the section being taken on the line 12—12 on Figure 13.

Figure 13 is a vertical cross section taken on the line 13—13 on Figure 12.

Figure 14 is an enlarged fragmentary vertical longitudinal section through that portion of the head carried pattern member on which the bell and non-circular surface shaping sleeve is mounted, the section being taken on the line 14—14 on Figure 15.

Figure 15 is a vertical cross section taken on the line 15—15 on Figure 14.

Figure 16 is an enlarged side elevation of the flask, the side illustrated in Figure 2 being shown, and parts being broken away and in section.

Figure 17 is an enlarged fragmentary vertical cross section taken on the line 17—17 on Figure 16.

Figure 18 is an enlarged fragmentary vertical cross section taken on the line 18—18 on Figure 16.

Figure 19 is an enlarged detail plan view of one of the slotted screen plugs with which the orifices adjacent the sand receiving end of the flask are equipped.

Figure 20 is a fragmentary vertical longitudinal section illustrating an end of the flask modified to include a bell enlargement.

Figure 21 is a fragmentary vertical cross section taken on the line 21—21 on Figure 5 and illustrating the means for adjusting the sand box supporting base on the trackways for accurately lining up the respective pattern member.

Figure 22 is a view similar to Figure 4 illustrating a modified form of sand box.

Figure 23 is a horizontal section taken on the line 23—23 on Figure 22.

Figure 24 is a detail face view of the quick opening plate valve illustrated in Figures 22 and 23.

Figure 25 is an enlarged horizontal longitudinal section illustrating a flask with a sand lining therein formed in accordance with the invention, and a pipe cast in the mold thus formed; parts being broken away.

Figure 26 is a side elevation illustrating the pipe casting shown in Figure 25, parts being broken away.

In the example of embodiment of the invention herein disclosed, there is included a frame structure comprising a base 5 whereon is fixed an I-beam like supporting trackway 6, the same being secured as at 7 on said base. See Figures 3, 3a, 9 and 10. The trackway includes an intermediate floor web 8 and may also be equipped with cross web reinforcements 9 and corner web reinforcements 10. At least near the ends thereof, the trackway is provided at its upper edges with inwardly turned track enlargements 11.

It will be apparent by reference to Figures 1, 2, 3, 3a and 10 that transverse support rails 12 are provided, the same extending across the tracks 11 in parallel spaced relation and being secured as at 13 on the sides of the beam 6. Transverse lifter bars 14 also are provided and extend across the tracks 11 in parallel spaced relation. The bars 14 are link connected at 15 at one side to brackets 16 secured to the trackway uprights, and similar brackets 17 are provided at the other side of the trackway beam and serve to support a rocker shaft 18 in the manner best illustrated in Figure 10. Crank links 19 secured to the shaft 18 are pivotally connected as at 20 to the bars 14, and the shaft 18 also has a crank extension 21 to which an actuator lever 22 is attached. It will be apparent that the links 15 and cranks 19 form a sort of parallel link arrangement, and that when the lever 22 is swung outwardly and downwardly from the position illustrated in Figure 10, said links and cranks will serve to lift the bars 14 from the position illustrated in Figure 10 in which they rest upon the tracks 11, upwardly and toward the right away from said tracks. The purpose of this lifting movement of the bars 14 will become apparent as this description progresses.

The parallel rails 12 provide rollways on which to receive and support cylindrical flasks to be described hereinafter, and said flasks are received on the rails 12 from rails 23 extending to one side of the trackway, or upwardly as viewed in Figure 1, and flasks are adapted to be rolled from the rails 12 onto receiving rails 24 extending away from the trackway at the opposite side, or downwardly as viewed in Figure 1.

Two cross plates 25 are secured to the floor web 8 as indicated at 26, and a pair of brackets 27 is laterally adjustably secured as at 28 on each said plate. See Figures 3, 3a and 10. Each bracket 27 rotatably supports a roller 29 at its upper end extremity and is backed up by an adjuster screw 30 threaded through the respective upright of the track 6.

One of the flasks in which a molding surface or lining of sand is to be formed in accordance with the invention is illustrated in the drawings and is generally designated 31. See Figures 3, 3a, 6, 9, 16 and 17 and it will be noted that such flasks are equipped with longitudinally spaced supporting rings 32. The rings preferably are so placed as to be engageable with rails 12, 23 and 24 in the manner illustrated in Figures 1 and 2 for maintaining the desired position of the flasks endwise of the apparatus. Each flask provides an inner sand liner receiving wall 33 and is equipped with a flared counterbore 34 at each end in which to receive a closure plate, said counterbores also being equipped with a plurality of circumferentially spaced apertures 35 in which to receive knock-out pins effective to secure end closure rings removably mountable in the sand lined flasks or molds incidental to the casting of pipe therein.

It will be apparent by reference to Figure 16 of the drawings that each flask is equipped with radially outwardly directed orifices extending about the whole circumference and throughout the whole length thereof. The orifices preferably are arranged in four sets, one set designated 36 being arranged adjacent the end of the flask in which the sand is introduced, and being larger than the other orifices. The second set of orifices, designated 37, extends from the end of the orifice set 37 a considerable distance in advance of the first of the support rings 32, throughout the extent of said ring and a short distance beyond the ring. The third set of orifices, designated 38, extends from the end of the set 37 throughout the remainder of the distance between the support rings 32, through the length of the second of the support rings 32, and throughout the remainder of the length of the flask except for a limited distance adjacent the end extremity remote from the end into which the sand is to be introduced. The fourth set of orifices, designated 39, extends throughout the limited remaining length of the flask between the terminus of the orifice set 38 and the adjacent end extremity of the flask.

The purpose of the orifices extending radially outwardly through the wall of each flask is to permit egress of air while preventing egress of sand. It has been found that this purpose is best accomplished, and the provision of flask linings of uniform density throughout is best assured by providing orifices or air escape openings of maximum size adjacent the end of the flask into which the sand is introduced, then to provide an orifice arrangement of slightly lesser air escape capacity throughout a limited portion of the length of the flask in which said least restricted passages are provided, then to provide the major length or main body portion of the flask with orifices of a capacity for permitting even lesser freedom of air escape, and then to provide adjacent the extremity of the flask remote from the end into which the sand is introduced an arrangement of orifices less restrictive in their air escape capacity than those provided throughout the main length of the flask. This is the arrangement illustrated in Figure 16, and it is to be understood that various modifications of the particular arrangement of the orifices are possible within the general purpose of the invention as stated.

One arrangement of orifices found practical involved the provision of the apertures of the first set, designated 36, five-eighths inch in diameter with a screen plug 40 such as is illustrated in Figures 18 and 19 inserted in each thereof and having screening slots of approximately .013" therein. All of the other orifices have small inlet portions 41 at their inner ends and larger outlet portions or bores 42 at their outer or discharge ends so as to minimize the possibility of clogging, and the orifices of the set designated 37 and the set designated 39 may be more closely spaced than the orifices of the set designated 38 and have an inlet diameter of one-eighth inch as compared to the greater inlet diameter of three-sixteenths of an inch of the apertures of the set designated 38.

Circumferentially spaced, longitudinally extending grooves 43 are provided in the external surface of each flask beneath and extending beyond the ends of the support rings 32 thereof in the manner clearly illustrated in Figures 16 and 17, and these grooves are effective to clear the air emitted beneath the rings so as to assure that the rings will not obstruct the desired escaping of air at the positions of the rings.

It is to be understood that while the main form of the flask is illustrated as cylindrical and with a cylindrical bore 33 therein, should it be desired to cast pipe or other generally cylindriform objects in a flask having projections beyond the inside diameter indicated at 33, said flasks may be provided with bell or other enlargements to suit the need as indicated at 44 in Figure 20.

By reference to Figures 2, 3, 4 and 5 of the drawings it will be observed that a sand box 45 is provided which is supported on a base 46 slidable over the tracks 11, at the right hand end thereof as viewed in Figure 2 or at the left hand end as viewed in Figure 3. The base 46 includes depending sides 47 for extending down below the top or supporting surfaces of the rail in the manner clearly illustrated in Figures 3 and 9, and said base is provided at the undersurface at each corner thereof with a brass shoe receiving recess 48, a similar recess 49 being provided at each corner in the respective side flanges 47. A brass shoe 50 is mounted in each said recess and is backed up by a threadably mounted adjuster screw 51. It will be apparent that by adjusting the several screws 51 the position of the base 46 on the supporting rails 11 can be accurately adjusted, for a purpose later to be described, and the adjustment of the several screws can be secured by lock nuts 52.

The sand box 45 is provided with axially aligned openings 53 adjacent the bottom thereof, and associated with each opening 53 is a counterbored seat 54. A closure ring 55 is received in one of the counterbores 54, and in the other counterbore is mounted an orifice ring 56 equipped with equidistantly or approximately equidistantly spaced orifices 57. While the orifices may be variously formed, the preferred form and arrangement is best illustrated in Figures 6 and 7 of the drawings. Eight such orifices are shown, and it will be apparent that those in the upper half of the ring are larger than the orifices arranged in the lower half. An example of an acceptable preferred arrangement is the provision of a top central orifice seven-eighths inch in diameter flanked by an orifice at each side having a diameter of thirteen-sixteenths of an inch. The remainder of the orifices in this example arrangement may be three-fourths inch in diameter. The orifices also preferably are flared as at 58. The purpose in providing larger orifices about the upper half of the orifice ring 56 is to compensate for the action of gravity during the blowing of the compressed-air-borne sand into the shaping chamber formed within the flask 31. The effect of this arrangement is to tend to overcome the action of gravity on the blown sand and assure the provision of a uniformly packed lining within the flask.

A tubular pattern member 59 is supported by the rings 55 and 56 in the manner clearly illustrated in Figures 3, 4 and 5 of the drawings, and it will be apparent by reference to Figures 3 and 11 that the member 59 is equipped with a reduced diameter male extension 60 at its free end extremity, said extension being closed or plugged as at 61. Attention also is directed to Figures 12 and 13 of the drawings from which it will be apparent that a pattern ring 62 is sweated on the pattern member, and the enlargement thus provided, or equivalent enlargement otherwise formed on the pattern member, is shaped to provide a non-circular shaping surface 63. The enlargement provides a cylindrical portion and a non-circular portion, the cylindrical portion serving to provide an abutment disposed to engage a tapered abutment ring which in turn engages the orifice ring 56 in the manner illustrated in Figures 4, 5 and 12, and said cylindrical portion of the pattern ring 62 also serves to provide an enlargement on the end of the cast pipe which can be externally threaded in the manner clearly illustrated in Figure 26, and the non-circular portion will serve to provide a non-circular projection on the cast pipe for receiving a wrench.

The end extremity of the pattern member remote from the closed end 61 is externally threaded as at 64 to receive a nut 65, and it will be apparent by reference to Figures 4 and 5 that by tightening the nut 65 on the threaded end 64 of the pattern member 59, the pattern member, and the rings 55 and 56 can be held in rigid assembly on the supporting sand box 45.

A supply duct 66 is secured by the nut 65 in communication with the open end of the pattern member 59, and the duct is equipped with a solenoid valve 67 and is connected by a flexible air supply line 68 with a suitable source of compressed air (not shown). It will be apparent that the pattern member 59 forms a cylindrical hollow within the sand box 45 and in general alignment with the portion of the pattern member which extends into the flask in the manner illustrated in Figures 3, 4 and 5, and the hollow forming portion of the pattern member is provided with orifices 69 through which air will be directed outwardly into the sand mass in the box 45 whenever the valve 67 is opened. A desirable arrangement is to place the orifices 69 spirally about the pattern member 59 within the sand box 45. In this manner each orifice will lie in an individual plane and objectionable weakening of the pattern member will be avoided. The sand box 45 is provided with a top extension 70, and a cone hopper 71 is attached to and extends upwardly from the box portion 70. A ring gasket 72 is provided in the constricted upper portion of the extension 70 and is engageable by a cone valve 73 which is vertically reciprocable, or in other words movable between a lowered, opened position and the hopper sealed position illustrated in Figures 3 and 4 by a piston plunger operable in a fluid pressure cylinder 74.

Attention is directed to Figures 4 and 5 from which it will be apparent that the sides of the pattern member 59 within the sand box 45 are provided with four apertures in which to receive unions 75. The unions nearest the center of the sand box are larger than the other two and serve as supports for a pair of uprightly disposed, parallel spaced stand pipes 76. The other unions serve as supports for a pair of uprightly disposed parallel spaced stand pipes 77. It will be noted that the four stand pipes are perforated so as to direct air from the interior of the pattern member 59 outwardly into the mass of sand in the sand box 45. It is preferred that the stand pipes 76 adjacent the center of the sand box be larger than the remaining stand pipes 77, or in other words the stand pipes most remote from the orifice ring 56. An example of an acceptable sizing of the stand pipes is to utilize one inch piping in the stand pipes 76 and three-fourths inch piping in the stand pipes 77. It was found that with this particular arrangement of stand pipes the desired aeration of the sand within the box 45 is obtained with very little, if any, danger of the air short circuiting directly through the orifices 57.

Attention is directed to Figures 2, 3a, 8 and 9 of the drawings from which it will be apparent that a head 78 supported on a base 79 is mounted on and slidable along the trackways 11, the base, like the previously described base of the sand box, being provided with depending sides 80 for extending downwardly at opposite sides of the trackways. Like the previously described base, the base 79 also is provided at each corner with adjuster devices generally designated 81 by which accurate adjustments of the position of the base can be made to accurately center the pattern member supported by the head with relation to the flask supports and the sand box carried pattern member 59. The head 78 is provided with a pattern mounting longitudinal bore 82 in which to receive the pattern member 83, the latter being threaded at its outer end as at 84 to receive the securing nut 85. At its inner or free end, the pattern member 83 is equipped with a female socket 86 in which to receive the previously described male extension 60 on the cooperating pattern member 59. The pattern member 83 also is equipped with an abutment collar 87 receivable in a recess 88 provided in the bell pattern sleeve 89 which is mounted on the pattern member in the manner illustrated in Figures 8 and 12 and which includes a non-circular shaping portion 90. The pattern sleeve is secured as at 91 to the abutment and orifice ring 92, the latter having a reduced shoulder 93 receivable in a counterbore recess formed in the adjacent end of the head 78. It will be noted by reference to Figures 3a and 8 that the depth of the counterbore 94 and the length of the ring shoulder 93 are such as to cause the main body of the ring to be spaced a distance from the adjacent end extremity of the head 78. This spaced portion of the ring 92 is equipped with equidistantly spaced air escape orifices 95 which are clearly illustrated in Figures 8, 9 and 14 and which serve to allow air to escape through the end closure of the shaping chamber while retaining the blown sand therein.

A fluid pressure cylinder 96 is centered under the head 78, being secured as at 97 to the floor web 8 of the track beam 6. A piston plunger 98 reciprocable in the cylinder is attached as at 99 to a bracket 100 depending from the head base 79, and it will be apparent that by properly directing pressure fluid into and from the cylinder it is possible to shift the head 78 and the pattern member 83 supported thereby back and forth between the position illustrated in Figures 1 and 3 of the drawings in which it is projected into the flask in axial alignment with the flask and the cooperating pattern member 59 and the retracted position illustrated in Figure 2.

A fluid pressure cylinder 101 is similarly positioned under the sand box 45 in the manner clearly illustrated in Figures 3 and 4 of the drawings, being secured as at 102 on the floor web 8 of the track beam 6. The piston plunger 103 reciprocable in the cylinder 101 is attached as at 104 to a bracket 105 depending from the base 46 of the sand box 45. It will be apparent that by properly directing pressure fluid into and discharging the same from the cylinder 101, the base 46, the sand box 45 and the pattern member 59 supported thereby can be shifted back and forth between the effective position illustrated in Figure 1 and the retracted position illustrated in Figure 2.

It is preferred that the shifting of the cooperating pattern members 59 and 83 between the effective Figure 1 position and the retracted Figure 2 position shall be simultaneously accomplished in each direction. This can be accomplished by passing the flow and return lines 106 connected with the opposite ends of the cylinders 96 and 101 through four-way solenoid valves diagrammatically indicated at 107 to individual pumps (not shown). The solenoid valves 107 may be connected in series in a control circuit 108 and controlled by a remote switch 109. In like manner a control circuit controlled by a remote control switch 110 placed near the switch 109 may be utilized for controlling the solenoid valve 67 through which air under pressure is directed into the duct 66, pattern member 59 and stand pipes 77, 76 into the sand box 45 sealed by the valve 73.

In Figures 22 and 24 there is illustrated a modified form of sand box including an outer shell 111 mounted on a track supported, shiftable base 112. As in the case of the previously described sand box, the shell 111 is provided with aligned openings 113 through which a pattern member 114 extends. The pattern member is secured as at 115 and extends through an orifice ring 116 through which the sand blown from the box is directed into the shaping chamber within the flask. The sand box is provided with a hopper extension 117 through which sand may be fed into the box through a vertically reciprocable cone valve 118 as in the previously described form.

A shell or jacket 119 is spaced inwardly from the outer shell 111 so as to provide an annular space about the inner shell and within the outer shell 111, and said inner shell is also spaced from the bottom of the outer shell as at 120. The shell 119 is perforated as at 121 about its sides and also in its bottom so that air directed under pressure into the space surrounding the inner shell 119 through the inlet 122 under control of the solenoid operated valve 123 will be directed radially inwardly through the side wall apertures 121, and also upwardly through the bottom apertures 121 into the sand mass within the inner shell and surrounding the portion of the pattern 114 which extends through said shell.

It is preferred that the orifices 121 in the inner shell 119 be so placed that a greater number thereof will be provided in the upright half of the shell which is remote from the orifice ring 16, and also that about twice as many orifices be placed in the lower half of the shell as in the upper half. The purpose of this arrangement of apertures is to prevent short circuiting of air directly through the orifice ring 116. The particular manner of arranging the orifices 21 herein stressed will tend to maintain a level of sand within the shell 119 and avoid the inclining of the top portion of the sand down toward the outlet at the orifice ring with resultant short circuiting of air.

If desired, a quick opening valve may be provided so that the air under pressure and the sand carried thereby will not be directed through the orifice ring 116 into the shaping chamber within the flask until the desired pressure of air has accumulated within the sand box. One manner of accomplishing this is by provision of a valve ring 124 mounted on a center hub of the orifice ring 116 and equipped with orifices 125 spaced similarly to those in the orifice plate so that by oscillation of the plate valve 124 through the medium of an actuating handle 126 the orifices 125 can be brought into registry with the orifice plate orifices to direct air-borne sand into the shaping chamber, or to close off communication between said cooperating orifices so as to retain the sand and air pressure within the sand box shells 111 and 119. A valve 127 may also be provided for venting the sand box after each sand blowing operation and before the valve 118 is to be opened to introduce sand into the box.

In the practical development of the invention, the flasks 31 are rolled one after another along the supporting rails 23 into position on the supporting rollers 29 as shown in Figures 3, 3a and 10. It is to be assumed that the spacing of the rollers and the adjusting devices 51 and 81 on the sand box and head pieces will have been accurately adjusted so as to place the pattern members 59 and 83 so as to accurately meet in the manner illustrated at the right in Figure 3 in perfect axial alignment and centered within the inner wall 33 of a flask with the end closure rings 56 and 92 engaging in centering relation in the respective ends of the flask when the bases 46 and 79 are shifted from the retracted position illustrated in Figure 2 to the effective or sand blowing position illustrated in Figure 1.

With a flask positioned in the supporting crotch provided between the pairs of rollers 29 in the manner illustrated in Figures 3 and 10, the operator manipulates the remote control switch 109 so as to properly adjust the valves 107 to bring about a shifting of the bases 46 and 79 from the retracted position illustrated in Figure 2 to the effective or sand blowing position illustrated in Figure 1. It is to be assumed that the sand box 45 has been supplied with sand through the control valve 73 and that said control valve has been lifted to the box sealing position illustrated in Figure 4.

By now actuating the remote control switch 110 to open the valve 67, air may be directed through the pipe 68 and duct 66 into the pattern member 59 and outwardly through the orifices 69 in the pattern member and the orifices in the stand pipes 76 and 77 into the sand box 45 and the mass of sand therein surrounding said pattern member. It is preferred that the air be directed into the sand box at approximately 125 pounds' pressure. The air under high pressure in the sand box will serve to aerate the mass of sand, and sand will be blown through the ring orifices 57 into the shaping chamber surrounding the cooperating, axially aligned patterns 59 and 83 within the centered flask 31. It will be apparent that the sand enters through the plate orifices in individual streams which merge so that the introduction of the sand is simultaneously about the whole circle of the shaping chamber, and by reason of the particular arrangement and sizing of the orifices 57 the action of gravity on the sand will have no objectionable effect in providing uneven distribution of the sand about the pattern members and within the shaping chambers. The air will be permitted to escape outwardly through the apertures in the flask 31 and the end closure ring 92 but the sand will be retained therein to provide a uniformly compact lining. It is to be understood that proper molding sand is used with which a suitable binder has been mixed so that the shaped molding surface in the same will be retained when the pattern members are withdrawn so as to provide satisfactorily hard molding surfaces against which to pour molten metal and against which the pipe can be centrifugally cast.

After the blowing of the sand in the manner stated the operator again manipulates the remote control switch 109 to actuate the solenoid valves 107 in a manner for reversing the direction of the pressure fluid into and from the cylinders 96 and 101 so as to effect a shifting of the bases 79 and 46 from the effective position illustrated in Figure 1 to the pattern member retracted positions illustrated in Figure 2. It will be noted that in this condition of the parts the flask 31 is entirely free of the pattern members. By now manipulating the lever 22 the crank arms 19 and rings 15 can be made to lift and shift laterally the support bars 114 so as to lift the sand lined flask from the supporting rollers 29 and present the same for being rolled away over the supporting rails 12 and 24. This operation having been completed the supply of sand in the box 45 will be replenished through the valve 73, air being permitted to escape from the box before any attempt is made to open the valve 73. It will be obvious that high pressure air within the box 45 will press the cone valve 73 tightly against the sealing gasket 72 and provide a sealed chamber for the sand within the box. The above described operations are repeated in the sand blowing or lining of other flasks.

The lined flasks may be rolled to another station at which the centrifugal casting of pipe therein can be effected. In order to accomplish this a closure ring 128 is applied to the flared counterbore 34 at one end of a flask 31 and retained therein by knock-out pins 129 in the manner clearly illustrated in Figure 25. The plate or ring 128 is provided with a central opening 130 through which the molten metal for the casting may be poured from a spout 131.

A closure plate 132 is similarly mounted at the other end of the flask, and said plate is equipped with a central escape opening 133 surrounded by a hollow sleeve extension 134 whereon is mounted a removable sand core plug 135. With the flask thus prepared for a casting operation, the pouring of molten metal into the sand lined flask through the spout 131 during a proper spinning of the flask will result in the casting of a pipe 136 in the manner illustrated in Figure 25. When the casting surface within the sand lined flask is formed in the manner previously described, the cast pipe will be equipped with a bell 137 at one end wherein will be included an inward extension or enlargement 138 suitable for having internal threads formed therein, and a non-circular portion 139 will be formed adjacent the bell so that a wrench may be applied during the threadable attachment of one section of pipe to another. At its other end the pipe also is provided with a non-circular, wrench receiving portion 140 and a circular enlargement 141 which may be externally threaded as at 142 in the manner clearly illustrated in Figure 26.

While one form of the invention has been shown for purposes of illustration, it is to be clearly understood that various changes in the details of construction and arrangement of parts may be made without departing from the spirit and scope of the invention as defined in the appended claims.

I claim:

1. In apparatus of the character described, horizontal trackways, two pairs of cooperating brackets mounted for lateral adjustment as to spacing relative to each other and said trackways, each said bracket having a roller thereon and each pair of rollers providing a flask supporting crotch, a cylindrical flask supported in the crotches formed by said pairs of rollers whereby movement of the rollers of a pair toward each other will lift the center of the flask, movement of the rollers apart will lower the flask center, and movement of both rollers in unison to one side or the other will move the flask center to one side or the other, a sand box slidable on the trackways at one end of the flask, a head slidable on the trackways at the other end of the flask, pattern members projecting toward each other from said box and head in axial alignment with each other and the flask axis, means for moving the box and head toward and from each other to place the pattern members in end contact in the flask and to provide an annular sand liner receiving and shaping chamber surrounding the pattern members within the flask, or to remove the pattern members from the flask, flask end closures carried by said box and head and engageable with the ends of the flask, the box carried closure having apertures spaced about its whole circumference for communication between the box and the interior of the flask, means for sealing the box, means for directing air under pressure into the box to force air and sand through said apertures into the flask about the pattern members, and means for permitting egress of air from the flask while retaining the sand as a uniformly compact mass therein.

2. In apparatus of the character described, a hollow cylindrical flask, means for supporting the flask in generally horizontal position, pattern means generally cylindriform in shape and of a diameter for being spaced inwardly of and coaxially with relation to the inner wall of the flask to cooperate therewith in forming an annular elongated sand lining receiving and shaping chamber, means for bringing about relative longitudinal movement between said flask and pattern means to place the pattern means in the annular chamber forming position or for removing it from said position, means for forming a closure at one end of said shaping chamber, means for holding a mass of sand opposite the other end of said chamber, means for directing air under pressure into the mass of sand to aerate the same and force sand into said shaping chamber, means for directing the air blown sand into said chamber endwise through said other end thereof simultaneously about the whole circle of the chamber while holding the flask and pattern means stationary, and means for permitting air to escape from the shaping chamber while retaining sand therein so as to fill the chamber with uniformly packed sand, said means for permitting the air to escape from the shaping chamber comprising escape orifices arranged circumferentially about and extending through the wall of the flask throughout the length thereof, said flask also having a plurality of supporting bands extending thereabout for rolling contact with supporting devices, and longitudinal grooves spaced about the circumference thereof beneath and extending at both ends beyond each said band and into which air escape orifices open, thereby to avoid obstruction of air egress by said bands.

3. In apparatus of the character described, a hollow cylindrical flask, means for supporting the flask in generally horizontal position, pattern means generally cylindriform in shape and of a diameter for being spaced inwardly of and coaxially with relation to the inner wall of the flask to cooperate therewith in forming an annular elongated sand lining receiving and shaping chamber, means for bringing about relative longitudinal movement between said flask and pattern means to place the pattern means in the annular chamber forming position or for removing it from said position, means for forming a closure at one end of said shaping chamber, means for holding a mass of sand opposite the other end of said chamber, means for directing air under pressure into the mass of sand to aerate the same and force sand into said shaping chamber, means for directing the air blown sand into said chamber endwise through said other end thereof simultaneously about the whole circle of the chamber while holding the flask and pattern means stationary, means for permitting air to escape from the shaping chamber while retaining sand therein so as to fill the chamber with uniformly packed sand, said pattern means comprising at least one pattern member movable endwise into and out of the flask, a trackway, a head slidable on the trackway and having provision thereon for stationarily supporting the movable pattern member in coaxial relation to the flask, and fluid pressure operated means for moving the head back and forth over the trackway, means also being provided for adjusting the position of the head in the trackway so as to properly align the pattern member with the flask.

4. In apparatus of the character described, a hollow cylindrical flask, means for supporting the flask in generally horizontal position, pattern means generally cylindriform in shape and of a diameter for being spaced inwardly of and coaxially with relation to the inner wall of the flask to cooperate therewith in forming an annular elongated sand lining receiving and shaping chamber, means for bringing about relative longitudinal movement between said flask and pattern means to place the pattern means in the annular chamber forming position or for removing it from said position, means for forming a closure at one end of said shaping chamber, means forming a sealed chamber in which to hold a mass of sand opposite and outside the other end of said shaping chamber, rigidly mounted stationary means for directing air under pressure into the mass of sand in said sealed chamber to aerate the same and force sand into said shaping chamber, means for directing the air blown sand into said shaping chamber endwise through said other end thereof simultaneously about the whole circle of the shaping chamber while holding the flask and pattern means stationary, means for permitting air to escape from the shaping chamber while retaining sand therein so as to fill the shaping chamber with uniformly packed sand, said pattern means comprising at least one pattern member which extends from and is supported by the sealed chamber forming means, a trackway whereon said sealed chamber forming means is slidably mounted, and fluid pressure operated means for moving the sealed chamber forming means and said pattern member back and forth over the trackway, means also being included for engagement by the pattern member as it is moved into position in the flask for centering the free end of said pattern member remote from the supporting sealing chamber forming means.

5. In apparatus of the character described, a hollow cylindrical flask, means for supporting the flask in generally horizontal position, pattern means generally cylindriform in shape and of a diameter for being spaced inwardly of and coaxially with relation to the inner wall of the flask to cooperate therewith in forming an annular elongated sand lining receiving and shaping chamber, means for bringing about relative longitudinal movement between said flask and pattern means to place the pattern means in the annular chamber forming position or for removing it from said position, means for forming a closure at one end of said shaping chamber, means forming a sealed chamber in which to hold a mass of sand opposite and outside the other end of said shaping chamber, rigidly mounted stationary means for directing air under pressure into the mass of sand in said sealed chamber to aerate the same and force sand into said shaping chamber, means for directing the air blown sand into said shaping chamber endwise through said other end thereof simultaneously about the whole circle of the shaping chamber while holding the flask and pattern means stationary, means for permitting air to escape from the shaping chamber while retaining sand therein so as to fill the shaping chamber with uniformly packed sand, said pattern means comprising at least one pattern member which extends from and is supported by the sealed chamber forming means, a trackway whereon said sealed chamber forming means is slidably mounted, and fluid pressure operated means for moving the sealed chamber forming means and said pattern member back and forth over the trackway, the means for directing air under pressure into the mass of sand comprising a cylindrical duct constituting a continuation of the pattern member within the sealed chamber forming means and surrounded by the sand mass, said duct having therein air delivery orifices opening outwardly into the sand mass about the whole circumference of the duct, the means for directing the air blown sand into the shaping chamber comprising a chamber end closure plate surrounding the pattern member and having therein approximately equidistantly spaced openings arranged in a circle and communicating between the sealed chamber and the shaping chamber, and there being included also valve controlled means for supplying air under pressure to said duct.

6. In apparatus of the character described, a hollow cylindrical flask, means for supporting the flask in generally horizontal position, pattern means generally cylindriform in shape and of a diameter for being spaced inwardly of and coaxially with relation to the inner wall of the flask to cooperate therewith in forming an annular elongated sand lining receiving and shaping chamber, means for bringing about relative longitudinal movement between said flask and pattern means to place the pattern means in the annular chamber forming position or for removing it from said position, means for forming a closure at one end of said shaping chamber, means forming a sealed chamber in which to hold a mass of sand opposite and outside the other end of said shaping chamber, rigidly mounted stationary means for directing air under pressure into the mass of sand in said sealed chamber to aerate the same and force sand into said shaping chamber, means for directing the air blown sand into said shaping chamber endwise through said other end thereof simultaneously about the whole circle of the shaping chamber while holding the flask and pattern means stationary, means for permitting air to escape from the shaping chamber while retaining sand therein so as to fill the shaping chamber with uniformly packed sand, said pattern means comprising two axially aligned pattern members one extending from and supported by the sealed chamber forming means and the other extending from and supported by a head member, trackways whereon said sealed chamber forming means and head member are slidable, and fluid pressure operated means for moving the sealed chamber forming means and said head member back and forth along said trackways to place the pattern members in and withdraw them from the flask, the means for directing air under pressure into the mass of sand comprising a cylindrical duct constituting a continuation of the pattern member within the sealed chamber forming means and surrounded by the sand mass, said duct having therein air delivery orifices opening outwardly into the sand mass about the whole circumference of the duct, and means for directing the air blown sand into the shaping chamber comprising a shaping chamber end closure plate surrounding the pattern member and having therein approximately equidistantly spaced openings arranged in a circle and communicating between the sealed chamber and the shaping chamber, and there being included also valve controlled means for supplying air under pressure to said duct.

7. In apparatus of the character described, a hollow cylindrical flask, means for supporting the flask in generally horizontal position, pattern means generally cylindriform in shape and of a diameter for being spaced inwardly of and coaxially with relation to the inner wall of the flask to cooperate therewith in forming an annular elongated sand lining receiving and shaping chamber, means for bringing about relative longitudinal movement between said flask and pattern means to place the pattern means in the annular chamber forming position or for removing it from said position, means for forming a closure at one end of said shaping chamber, means forming a sealed chamber in which to hold a mass of sand opposite and outside the other end of said shaping chamber, rigidly mounted stationary means for directing air under pressure into the mass of sand in said sealed chamber to aerate the same and force sand into said shaping chamber, means for directing the air blown sand into said shaping chamber endwise through said other end thereof simultaneously about the whole circle of the shaping chamber while holding the flask and pattern means stationary, means for permitting air to escape from the shaping chamber while retaining sand therein so as to fill the shaping chamber with uniformly packed sand, said pattern means comprising two axially aligned pattern members one extending from and supported by the sealed chamber forming means and the other extending from and supported by a head member, trackways whereon said sealed chamber forming means and head member are slidable, and fluid pressure operated means for simultaneously moving the sealed chamber forming means and the head member toward or from each other along the trackways to place the pattern members in the flask or withdraw them from the flask.

(References on following page)

References Cited in the file of this patent

UNITED STATES PATENTS

| Number | Name | Date |
|---|---|---|
| 393,208 | Carr | Nov. 20, 1888 |
| 1,427,349 | Beardsley | Aug. 29, 1922 |
| 1,561,500 | Wood | Nov. 17, 1925 |
| 1,613,899 | Moore | Jan. 11, 1927 |
| 1,695,855 | Moore et al. | Dec. 18, 1928 |
| 1,866,301 | Goodlin | July 5, 1932 |
| 1,910,417 | Zeeman | May 23, 1933 |
| 1,923,237 | Stahn | Aug. 22, 1933 |
| 2,025,404 | Stahn | Dec. 24, 1935 |
| 2,048,190 | Lindbury | July 21, 1936 |
| 2,107,814 | Billand | Feb. 8, 1938 |
| 2,112,910 | Jeffery | Apr. 5, 1938 |
| 2,263,974 | Rienacker | Nov. 25, 1941 |
| 2,340,262 | Crawford | Jan. 25, 1944 |
| 2,445,141 | Hardy | July 13, 1948 |

FOREIGN PATENTS

| Number | Country | Date |
|---|---|---|
| 228,070 | Great Britain | Jan. 29, 1925 |
| 341,673 | Great Britain | Jan. 22, 1931 |
| 606,534 | Great Britain | Aug. 16, 1948 |
| 557,503 | Germany | Aug. 24, 1932 |
| 646,304 | Germany | June 11, 1937 |